(12) United States Patent
Malki et al.

(10) Patent No.: US 11,946,340 B2
(45) Date of Patent: Apr. 2, 2024

(54) HEAT TREATING TUBULARS

(71) Applicant: Saudi Arabian Oil Company, Dhahran (SA)

(72) Inventors: Bandar S. Malki, Dammam (SA); Ayedh M. Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 17/644,037

(22) Filed: Dec. 13, 2021

(65) Prior Publication Data
US 2023/0184060 A1    Jun. 15, 2023

(51) Int. Cl.
*E21B 36/04* (2006.01)
*E21B 33/03* (2006.01)
*H05B 3/56* (2006.01)
*E21B 36/00* (2006.01)

(52) U.S. Cl.
CPC .............. *E21B 36/04* (2013.01); *H05B 3/56* (2013.01); *E21B 36/005* (2013.01)

(58) Field of Classification Search
CPC ........ E21B 17/003; E21B 36/04; E21B 36/00; E21B 36/005; E21B 33/03; F16L 53/34; F16L 53/30; F16L 53/38; Y10T 137/6606; H05B 3/342; H05B 2203/014; H05B 2214/03
See application file for complete search history.

(56) References Cited

U.S. PATENT DOCUMENTS

| | | | | |
|---|---|---|---|---|
| 2,512,226 A * | 6/1950 | Edwards | ................. | E21B 36/04 166/227 |
| 4,575,617 A * | 3/1986 | Cooper | ............. | G05D 23/1906 219/535 |
| 5,049,724 A * | 9/1991 | Anderson | .............. | H05B 3/342 219/535 |
| 6,727,481 B1 * | 4/2004 | Wilds | ....................... | H05B 3/58 392/468 |
| 8,176,983 B1 * | 5/2012 | Foley | ...................... | E21B 36/00 166/57 |
| 2003/0168518 A1 * | 9/2003 | Beida | .................... | E21B 36/006 237/80 |
| 2006/0102615 A1 * | 5/2006 | Carriere | ................. | H05B 3/342 219/528 |
| 2006/0289000 A1 * | 12/2006 | Naylor | .................... | F24C 7/043 126/96 |

(Continued)

OTHER PUBLICATIONS red-d-arc.com [online], "Cooperheat 70kVA Heat Treatment Module," Red-D-Arc Welderentals, available on or before 2021, retrieved on Oct. 25, 2021,<https://www.red-d-arc.com/product_details.aspx?sub_cat=376&prod_id=1797>, 2 pages.

(Continued)

*Primary Examiner* — Kipp C Wallace
(74) *Attorney, Agent, or Firm* — Fish & Richardson P.C.

(57) ABSTRACT

An exposed resistive heating element is coupled to an electric power supply. The exposed resistive heating element is malleable such that it can be wrapped around a component to be heated. A controller is coupled to the power supply and the exposed resistive heating element. The controller is configured to regulate current exchanged between the exposed heating element and the electric power supply.

8 Claims, 2 Drawing Sheets

(56) References Cited

U.S. PATENT DOCUMENTS

2007/0289636 A1* 12/2007 Chitwood ............. F16L 59/161
　　　　　　　　　　　　　　　　　　　　　　　　137/375
2022/0243559 A1* 8/2022 Zhao ....................... E21B 33/03

OTHER PUBLICATIONS

Energy Safety Canada, "Drilling And Completion Committee IRP 5: Minimum Wellhead requirements," Jun. 2018, 134 pages.
red-d-arc.com [online], "Ceramic Pad Heating Elements," Red-D-Arc Welderentals, available on or before 2021, retrieved on Oct. 25, 2021, retrieved from URL <https://www.red-d-arc.com/product_details.aspx?sub_cat-376&prod_id=1823>, 2 pages.

* cited by examiner

HEAT TREATING TUBULARS

TECHNICAL FIELD

This disclosure relates to heat treating metals before, after, or during welding operations.

BACKGROUND

When welding components together, components are often heat-treated before or after welding to prevent warping and embrittlement. Various methods of heat-treatment can be used, for example, open flames. Heat-treating becomes more important when pressure containing components are welded together as embrittlement can result in catastrophic failure.

SUMMARY

This disclosure describes technologies relating to heat-treating tubulars.

An example of the subject matter described within this disclosure is a heat-treatment system with the following features. An exposed resistive heating element is coupled to an electric power supply. The exposed resistive heating element is malleable such that it can be wrapped around a component to be heated. A controller is coupled to the power supply and the exposed resistive heating element. The controller is configured to regulate current exchanged between the exposed heating element and the electric power supply.

Aspects of the example heat treatment system, which can be combined with other aspects of the example heating system alone or in combination with other aspects, can include the following. The controller is coupled to the exposed resistive heating element by a receptacle block.

Aspects of the example heat treatment system, which can be combined with other aspects of the example heating system alone or in combination with other aspects, can include the following. The power supply is an alternating current power supply.

Aspects of the example heat treatment system, which can be combined with other aspects of the example heating system alone or in combination with other aspects, can include the following. The alternating current power supply is a 220 volt power supply.

Aspects of the example heat treatment system, which can be combined with other aspects of the example heating system alone or in combination with other aspects, can include the following. The controller comprises a knob coupled to a potentiometer or stepped resistor.

Aspects of the example heat treatment system, which can be combined with other aspects of the example heating system alone or in combination with other aspects, can include the following. A length of the exposed resistive heating element is sufficient to encircle the component multiple times.

Aspects of the example heat treatment system, which can be combined with other aspects of the example heating system alone or in combination with other aspects, can include the following. The exposed resistive heating element is configured to contact a surface to be heated.

An example of the subject matter described within this disclosure is a method with the following features. A current is received by an exposed resistive heating element encircling a tubular. The tubular is heated by the exposed heating element responsive to the received current.

Aspects of the example method, which can be combined with other aspects of the example method alone or in combination with other aspects, can include the following. A current is regulated by a controller.

Aspects of the example method, which can be combined with other aspects of the example method alone or in combination with other aspects, can include the following. Heating the tubular includes increasing a temperature to a specified heat treatment temperature and maintaining the temperature for a sufficient duration of time to heat-treat the tubular.

Aspects of the example method, which can be combined with other aspects of the example method alone or in combination with other aspects, can include the following. The tubular includes a wellhead and an uphole end of well casing.

Aspects of the example method, which can be combined with other aspects of the example method alone or in combination with other aspects, can include the following. The exposed resistive heating element is received prior to current being received by the exposed resistive heating element. Receiving the exposed resistive heating element includes the resistive heating element encircling the tubular multiple times. The exposed resistive heating element contacts a surface of the tubular.

Aspects of the example method, which can be combined with other aspects of the example method alone or in combination with other aspects, can include the following. The exposed resistive heating element is removed after the tubular has been heated.

An example of the subject matter described within this disclosure is a system with the following features. A well casing protrudes from a subterranean formation. A wellhead is connected to an uphole end of the well casing. An exposed heating element is coupled to an electric power supply. The exposed heating element is malleable such that it can be wrapped around the casing or the wellhead. A controller is coupled to the power supply and the exposed heating element. The controller is configured to regulate current exchanged between the exposed heating element and the electric power supply.

Aspects of the example system, which can be combined with other aspects of the example system, alone or in combination with other aspects, can include the following. The power supply is a direct current power supply.

Aspects of the example system, which can be combined with other aspects of the example system, alone or in combination with other aspects, can include the following. The controller is coupled to the exposed heating element by a receptacle block.

Aspects of the example system, which can be combined with other aspects of the example system, alone or in combination with other aspects, can include the following. The exposed heating element is a resistive heating element.

Aspects of the example system, which can be combined with other aspects of the example system, alone or in combination with other aspects, can include the following. The controller includes a knob coupled to a potentiometer or stepped resistor.

Aspects of the example system, which can be combined with other aspects of the example system, alone or in combination with other aspects, can include the following. A length of the exposed heating element is sufficient to encircle the wellhead and the well casing multiple times.

Aspects of the example system, which can be combined with other aspects of the example system, alone or in combination with other aspects, can include the following. The exposed heating element is configured to contact a surface to be heated.

Aspects of the example system, which can be combined with other aspects of the example system, alone or in combination with other aspects, can include the following. The exposed heating element includes a nickel chromium alloy.

Particular implementations of the subject matter described in this disclosure can be implemented so as to realize one or more of the following advantages. The subject matter described herein allows for rapid deployment and set-up of heat-treatment equipment in a field environment. The subject matter described herein allows for a single sized heat-treatment system to treat multiple sizes of components. The subject matter herein is safer and more efficient than wood burning fires that are used for heat-treatment.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to heat-treating components, such as wellheads and casing, during welding operations. The systems described herein include an exposed resistive heating element of sufficient length to wrap around a target component multiple times. As the heating element is exposed, multiple wrap arrangements can be used. Alternatively or in addition, a same exposed heating element can be used on various sizes of components to be heat treated.

Figure 1:
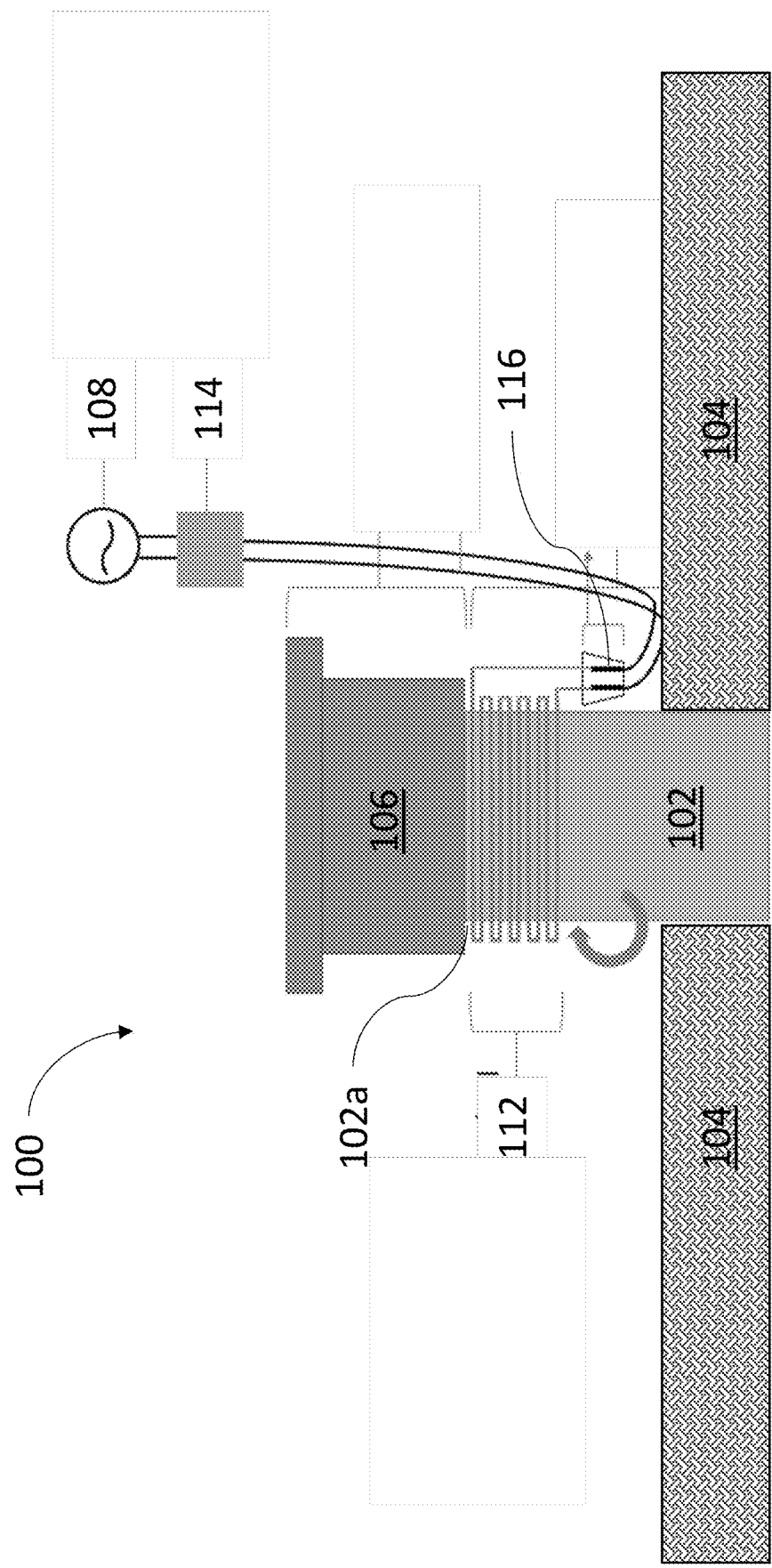
FIG. 1 is a schematic diagram of an example heat-treatment system installed on an uphole end of a casing string.

FIG. 1 is a schematic diagram of an example heat-treatment system 100 installed on an uphole end 102a of a casing 102. The well casing 102 protrudes from a subterranean formation 104 at a terranean surface. The uphole end 102a of the casing 102 is connected to a wellhead 106. Typically, the wellhead 106 is welded to the uphole end 102a of the casing 102. This weld experiences well pressure during production operations. As such, weld integrity is ensured through the heat-treatment systems and methods described throughout this disclosure.

An electric power supply 108 is present to power the heat-treatment system 100. The electric power supply can include an outlet from the topside facility and can supply power from the local electric grid or power produced on-site. As illustrated, the electric power supply 108 is an alternating current power supply. The alternating current power supply can provide power at a variety of voltages, for example, 110 volts, 120 volts, 220 volts, 240 volts, 440 volts, or 480 volts. In instances where an alternating current electric power supply is used, single or multi-phased power can be provided. In some implementations, a direct current power supply can be used with a similar affect.

The heat itself is supplied by an exposed resistive heating element 112 coupled to the electric power supply 108 by a controller 114. The exposed resistive heating element 112 is malleable such that it can be wrapped around the casing 102, the wellhead 106, or both. In general, the exposed resistive heating element has sufficient length to wrap around the casing 102, the wellhead 106, or both, multiple times. The exposed resistive heating element 112 is made of a metal with properties that allow for extreme thermo-cycling while maintaining malleability, such as a nickel-chromium alloy. In some implementations, during use, the exposed resistive heating element 112 is configured to contact a surface to be heated, such as the wellhead 106 or the casing 102.

As previously mentioned, the controller 114 is coupled to the electric power supply 108 and the exposed resistive heating element 112. The controller 114 itself is configured to regulate current exchanged between the exposed resistive heating element 112 and the electric power supply 108. In some implementations, the controller 114 uses varying resistance to limit the current to the exposed resistive heating element 112. For example, a potentiometer or a stepped resistor can be used. Such an arrangement results in an open-loop controller that can be easily controlled with a simple knob. Alternatively or in addition, other open-loop circuits can be used, such as a chopper circuit or a TRIAC (triode for alternating current) regulator. In some implementation, dedicated integrated circuit designs can be used without departing from this disclosure.

In some implementations, the controller 114 is coupled to the exposed resistive heating element 112 by a receptacle block 116. The receptacle block 116 receives ends of the exposed resistive heating element 112 (male ends) and retains them within the receptacle block terminals (female ends) during operations. This arrangement allows long electrical wires to be run from the controller to the heat-treatment site as power is not always readily available adjacent to a production well.

Figure 2:
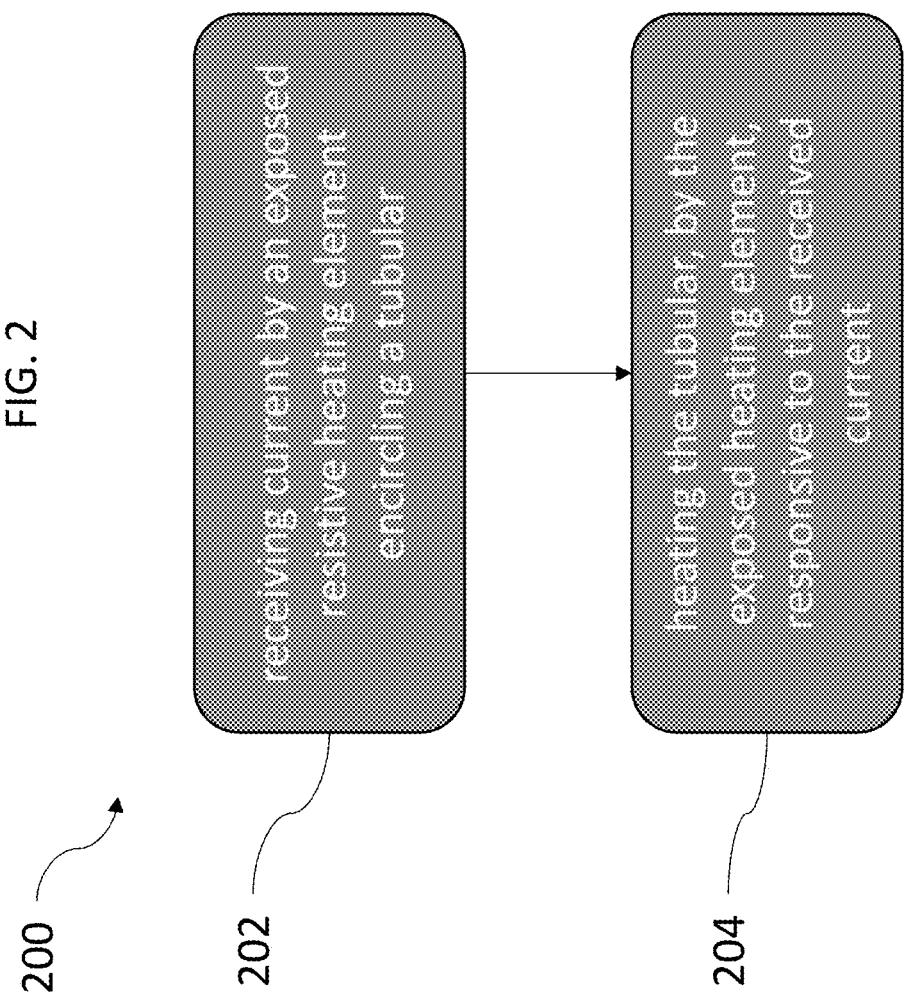
FIG. 2 is a flowchart of an example method that can be used with aspects of this disclosure.

FIG. 2 is a flowchart of an example method 200 that can be used with aspects of this disclosure. During operations requiring heat treatment, the exposed resistive heating element 112 is received by a tubular, such as the wellhead 106 at the uphole end of the casing 102, the casing 102 itself, or both. The exposed resistive heating element 112 encircles the tubular multiple times and contacts a surface of the tubular.

At 202, a current is received by the exposed resistive heating element 112 encircling a tubular. At 204, the tubular is heated by the exposed heating element responsive to the received current. The current is regulated by the controller 114. The tubular is heated to a specified heat treatment temperature, for example, for pre-or post-welding heat treatment. Similarly, the tubular is heated for a sufficient duration of time to heat-treat the tubular as desired. Once heat treatment operations are completed, the exposed resistive heating element is removed. The exposed resistive heating element 112 can be used multiple times on various components to be heat treated. For example, after a wellhead has been heat treated, the exposed resistive heating element 112 can be wrapped around an adjacent wellhead. Alternatively or in addition, the exposed resistive heating element 112 can be packed and shipped to another well site to be used at a later date.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a well casing protruding from a subterranean formation;
   a wellhead connected to an uphole end of the well casing;
   an electric power supply;
   an exposed heating element coupled to the electric power supply, the exposed heating element being malleable such that it can be wrapped around the well casing or the wellhead, wherein the exposed heating element is configured to heat treat the well casing or the wellhead; and
   a controller coupled to the power supply and the exposed heating element, the controller configured to regulate current exchanged between the exposed heating element and the electric power supply.

2. The system of claim 1, wherein the power supply is a direct current power supply.

3. The system of claim 1, wherein the controller is coupled to the exposed heating element by a receptacle block.

4. The system of claim 1, wherein the exposed heating element is a resistive heating element.

5. The system of claim 1, wherein the controller comprises a knob coupled to a potentiometer or stepped resistor.

6. The system of claim 1, wherein a length of the exposed heating element is sufficient to encircle the wellhead and the well casing multiple times.

7. The system of claim 1, wherein the exposed heating element is configured to contact a surface to be heated.

8. The system of claim 1, wherein the exposed heating element comprises a nickel chromium alloy.

* * * * *